US008145607B1

(12) United States Patent
Korshunov et al.

(10) Patent No.: US 8,145,607 B1
(45) Date of Patent: Mar. 27, 2012

(54) SYSTEM AND METHOD FOR ONLINE BACKUP AND RESTORE OF MS EXCHANGE SERVER (75) Inventors: Igor E. Korshunov, Moscow (RU);
Maxim V. Lyadvinsky, Moscow (RU);
Serguei M. Beloussov, Singapore (SG)

(73) Assignee: Acronis Inc., Tortola (VG)

( * ) Notice: Subject to any disclaimer, the term of this patent is extended or adjusted under 35 U.S.C. 154(b) by 320 days.

(21) Appl. No.: 12/330,650

(22) Filed: Dec. 9, 2008

(51) Int. Cl.
*G06F 17/00* (2006.01)
*G06F 7/00* (2006.01)

(52) U.S. Cl. .................. 707/674; 707/640; 707/661

(58) Field of Classification Search .......... 707/999.202, 707/674, 640, 661
See application file for complete search history.

(56) References Cited

U.S. PATENT DOCUMENTS

| | | | | |
|---|---|---|---|---|
| 6,202,085 B1 * | 3/2001 | Benson et al. | ............... | 709/205 |
| 7,155,633 B2 * | 12/2006 | Tuma et al. | ....................... | 714/5 |
| 7,246,207 B2 * | 7/2007 | Kottomtharayil et al. | .... | 711/154 |
| 7,651,593 B2 * | 1/2010 | Prahlad et al. | ............... | 202/204 |
| 7,707,184 B1 * | 4/2010 | Zhang et al. | ................... | 707/645 |
| 7,962,709 B2 * | 6/2011 | Agrawal | ...................... | 711/162 |
| 8,001,079 B2 * | 8/2011 | Lu et al. | ......................... | 707/616 |
| 2004/0010487 A1 * | 1/2004 | Prahlad et al. | ................... | 707/1 |
| 2005/0033756 A1 * | 2/2005 | Kottomtharayil et al. | .... | 707/100 |
| 2005/0144520 A1 * | 6/2005 | Tuma et al. | ...................... | 714/15 |
| 2006/0010154 A1 * | 1/2006 | Prahlad et al. | ............... | 707/102 |
| 2006/0053181 A1 * | 3/2006 | Anand et al. | .................. | 707/204 |
| 2006/0095705 A1 * | 5/2006 | Wichelman et al. | .......... | 711/171 |
| 2008/0183775 A1 * | 7/2008 | Prahlad et al. | ................ | 707/204 |
| 2008/0263103 A1 * | 10/2008 | McGregor et al. | ............ | 707/200 |
| 2009/0125669 A1 * | 5/2009 | Gupta et al. | .................. | 711/103 |
| 2009/0222498 A1 * | 9/2009 | Lu et al. | ........................ | 707/204 |
| 2010/0005151 A1 * | 1/2010 | Gokhale | ....................... | 709/216 |
| 2010/0077160 A1 * | 3/2010 | Liu et al. | ....................... | 711/162 |

OTHER PUBLICATIONS

Schmied, Will, "The Exchange Server 2000 Database Structure: It's always a rainy day when you're doing restorations", MSExchange.org Articles & Tutorials, Jul. 21, 2004, pp. 1-6.*
Robichaux, Paul, Managing Microsoft Exchange Server, O'Reilly & Associates, Inc., Sebastopol, CA, Jul. 1999, pp. 298-309 and 551-583.*
Buike, Rodney, "Transaction Logs, The Lifeblood of Exchange", MSExchange.org Articles & Tutorials, May 30, 2006, pp. 1-6.*
Grote, Marc, "Exchange 2003 Backup and Restore with NTbackup", MSExchange.org Articles & Tutorials, May 17, 2005, pp. 1-10.*

(Continued)

*Primary Examiner* — Robert Stevens
(74) *Attorney, Agent, or Firm* — Bardmesser Law Group (57) ABSTRACT

A system, method and computer program product for backup and restore of MS Exchange server. The method for MS Exchange Server backup and restore comprises launching a system filter and applying logs; mounting a data base from files located in a virtual folder; moving the file data from the archive into the real folder while the MS Exchange Server remains open and the database being restored is mounted. The data is moved into the real folder from the archive by blocks. The database files of the MS Exchange Server are divided into data sets (i.e., blocks). For each block a special bit in its bitmap is marked to indicate, whether this block has been moved to the real folder or still remains in the archive (i.e., backup). When the blocks are moved, the updated blocks do not need to be transferred from the archive into the real folder. After the data blocks are moved into the real folder, the restored database is dismounted and the virtual folder is dismounted. The system filter is turned off and the database is mounted without employing the system filter.

9 Claims, 7 Drawing Sheets

OTHER PUBLICATIONS

Zinman, Amit, "Exchange Backup Strategies", MSExchange.org Articles & Tutorials, Jul. 20, 2004, pp. 1-5.*

Walther, Henrik, "Configuring Exchange Server 2007 Preview—Chapter 9: Disaster Recovery with Exchange Server 2007", MSExchange.org Articles & Tutorials, Mar. 7, 2007, pp. 1-39.*

Srinivasan, Dr. Vas, "High Availability and Disaster Recovery for Exchange Servers—A Comparative Analysis", MSExchange.org Articles & Tutorials, May 7, 2008, pp. 1-5.*

Mosher, Sue, The Microsoft Exchange User's Handbook, Duke Press, Loveland, Co, © 1997, pp. 305-311.*

Buike, Rodney, "Understanding the Exchange Information Store", MSExchange.org Articles & Tutorials, Dec. 9, 2005, pp. 1-5.*

Wallingsford, Robert, MCSE Training Guide: Microsoft Exchange Server 5.5, New Riders Publishing, Indianapolis, IN, © 1998, pp. 284-293.*

Silva, Rui, "Backing Up Exchange with Data Protection Manager", MSExchange.org Articles & Tutorials, Jul. 13, 2006, pp. 1-13.*

Walther, Henrik, "Installing a Two Node Exchange Server 2007 Single Copy Cluster (SCC) in a Virtual Server Test Environment—Part 1: Preparing the virtual environment", MSExchange.org Articles & Tutorials, Sep. 19, 2006, pp. 1-14.*

Grote, Marc, Using the Exchange tools ISINTEG and ESEUTIL to Ensure the Health of your Information Store, Feb. 24, 2005, pp. 1-11.*

Barnes, Chris, et al., "Using ASDM to Back Up and Recover Microsoft Exchange Server", IBM Redbooks, IBM Corp., International Technical Support Organization, Document No. SG24-5266-00, Nov. 1998, 116 pages.*

Randall, Pat, et al., "Deploying the Tivoli Storage Manager Client in a Windows 2000 Environment", IBM Redbooks, IBM Corp., International Technical Support Organization, Document No. SG24-6141-00, Apr. 2001, 190 pages.*

* cited by examiner

SYSTEM AND METHOD FOR ONLINE BACKUP AND RESTORE OF MS EXCHANGE SERVER

BACKGROUND OF THE INVENTION

1. Field of the Invention

The present invention is related to online backup and restoration of an Microsoft Exchange server, and more particularly, to working with backed up data without restoration of the data to the data storage device of a computer system.

2. Description of the Related Art

Electronic mail has become an invaluable application for most of the enterprises over a past decade. However, initially it was difficult to implement reserve copying (i.e., backup) and restoration of the email-related information. If the system failed, some data was not recoverable, thus causing significant damage to an enterprise. Therefore, it is very important for the enterprises to implement effective means for reserve copying and recovery of data without producing a significant operational overhead.

An MS Exchange Server is a distributed database and an information exchange environment having a functionality of a mail client intended for internal use (i.e., information exchange among employees of an enterprise). Most of the critical information of the enterprise is stored in the database of the MS Exchange Server. In order to protect this information in case of system failure or user error, a regular backup of the MS Exchange mail data is needed.

Microsoft Clustering allows preventing system crashes by employing additional system resources called nodes that are used with a central cluster manager. The central cluster manager coordinates load balancing and data activity. Typically, the nodes use common storage devices and can take a load off of a failed node. Two types of cluster environments exist: an active/active environment and an active/passive environment. In the active/active environment, each node of the environment is active and able to process requests. If one of the active nodes fails, the other active nodes begin to process more requests (i.e., the load is redistributed among the remaining nodes).

In the active/passive cluster environment, only one active node exists. This active node processes all incoming requests. If the active node fails, the passive node is activated by the cluster manager and the incoming requests are processed by this node. In this case the system uses additional hardware and produces significant operational overhead.

A Microsoft Exchange Server supports both, an active/active cluster environment and an active/passive cluster environment. Clusterization of the MS Exchange Server provides a very high stability that is generally not affected by failure of individual nodes. However, it does not provide any security against failures or corruptions of data storages. Typically, for a particular size of a cluster environment, plurality of hard disks is used for creation of storage of a desired size.

Figure 1:
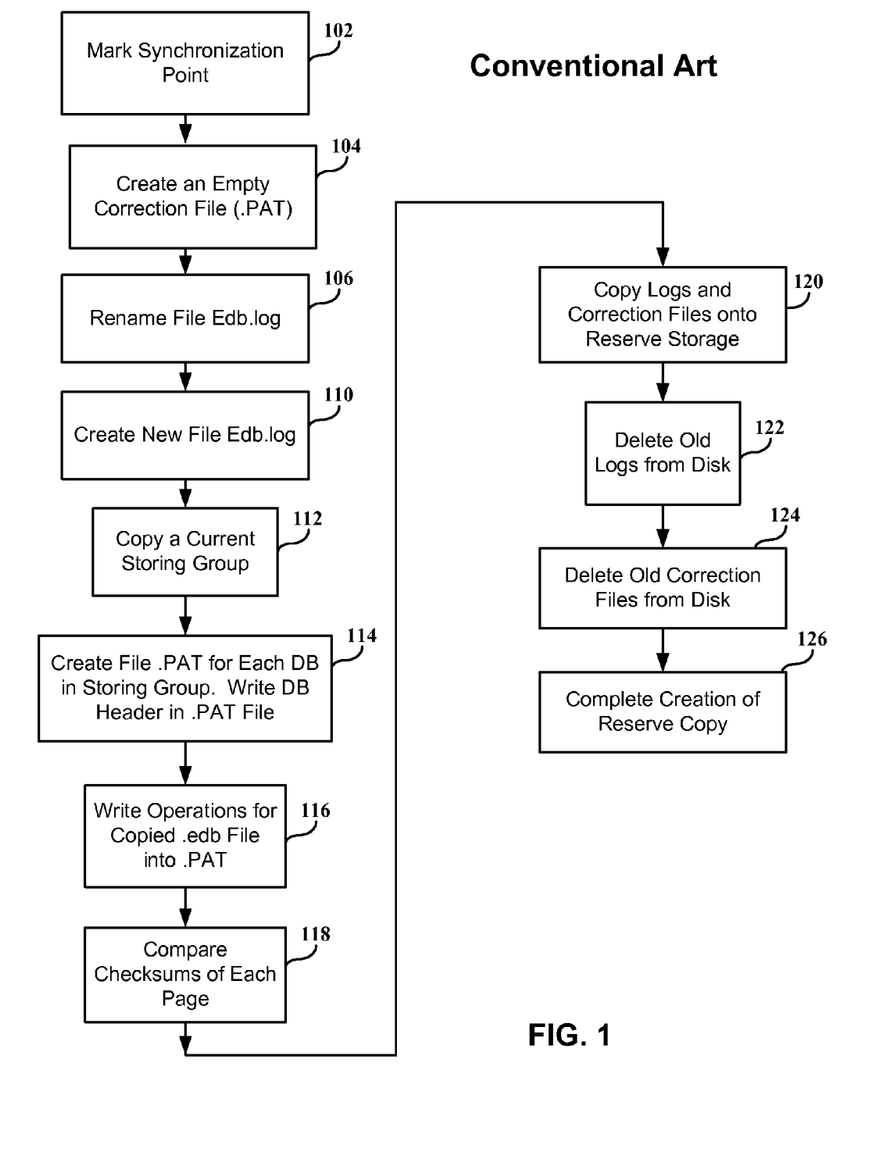
FIG. 1 illustrates a flowchart of a conventional method of MS Exchange Server backup.

FIG. 1 illustrates a flow chart of a standard backup process of MS Exchange Server. The process of reserve on-line copying (i.e., run-time backup) of MS Exchange Server is started by launching a reserve copying application. This application calls a Web Storage System Service (WSS) indicating the desired type of reserve copying. Then, the backup process is started at step 102 by marking a synchronization point of the backup.

A this point the WSS informs an Exchange Server Engine (ESE) that it is in a reserve copying mode and an empty correction file (".PAT") is generated in step 104 for each database being backed up (in case of a full backup). Note that during the process of full online backup, the database is open for access and transactions can still be recorded in the database. If a transaction invokes an operation for an already copied database file (.edb) over the point of the reserve copying (i.e., a flag in ".edb" file indicating what is already copied and what is not yet copied), the page before the boarder is written into a correction file ".PAT".

A separate ".PAT" file for each backed up database is used. These files are used only for a full backup and recovery. The correction files are not generated for incremental or additional backups. When the ESE is placed into a reserve copying mode, a new log file is open. For example, if a log file "edb.log" is currently open, it is closed and renamed at step 106 in order to correspond to the latest set of transactions. Then, a new file "edb.log" is created at step 110. At this point the ESE can truncate the logs after completion of reserve copying.

The reserve copying is performed at step 112, and the ESE is requested to read the database and re-order pages. After the pages are ordered at step 114 by creating a correction file (.PAT) for each database and writing the database header into the correction file, they are grouped into fragments of 64 KB each (i.e., 16 pages) and loaded into the operating memory. The operations corresponding to each copied database (".edb" file) are also written into the ".PAT" file at step 116. Then, the ESE checks a checksum for each page in order to confirm the integrity of data at step 118.

A checksum can be in a form of a hash string consisting of 4-bite segments. Such a hash string is generated and added to each page of the database for controlling the integrity of the page. The original checksum of the page is compared to a checksum of the page read into RAM. Thus, it is verified that the data read out of the database and the data written into the database are identical.

A typical database page structure has the first 82 bites allocated for page headers and flags indicating page type, as well as information about the data types contained in the page. When the page is loaded into memory, the checksum is calculated and a page number is verified. If the checksum does not coincide with the original checksum, then the page is corrupted. The ESE, in this case, will return an error, the database will be suspended and information about the corrupted page will be recorded in the transaction log.

Note that the ESE does not cause page corruption, but only notifies about corrupted pages. The page corruption takes place when data is written onto a disk. In most cases corruption of database pages is caused by equipment or device driver failure. It is important to make sure that the drivers are updated and the latest versions are used. The Microsoft Product Support Services (PSS) can work with equipment manufacturers for solving all problems existing between their equipment and the Exchange Server database.

Comparing the checksums prevents from storing corrupted data. Thus, a successfully created reserve copy of the MS Exchange Server database is definitely not corrupted, since each individual page is checked prior to copying it into a reserve database.

After the reserve copying is completed and all pages are read by a reserve copy utility, it copies the logs and correction files onto reserve storage at step 120. Then, the logs are truncated or deleted at step 122 when a new generation of files is created at the beginning of reserve copying. Also, the old correction files are erased from the disk at step 124. Then, the reserve files are closed, the ESE goes into a normal mode of operation and the reserve copying is completed at step 126. Note that in case of incremental or additional backups, only log files are used. Any operations using correction files, checksums and sequential reading of pages are not performed.

In a network or distributed system environment employing a large number of devices, a malfunction is highly likely. If a hard disk gets corrupted, the applications do not execute correctly. However, all the nodes in the cluster can be using this hard disk as a common storage containing all files (including the files of the MS Exchange Server database). Thus, an enterprise remains vulnerable to the MS Exchange Server crashes.

In light of increasing dependency of the enterprises on MS Exchange Servers, users need some means for overcoming MS Exchange Server crash or malfunction in case of remote and local servers. Such means can protect an enterprise from the consequences of a massive MS Exchange Server crash.

A process of restoring an MS Exchange Server database takes a long time. During this time the MS Exchange Server is suspended until the database is fully restored and the logs are not applied to the database. Therefore, a method for rapid backup of the MS Exchange Server and data restoration without the MS Exchange Server being suspended is desired. It is also desired to be able launch the MS Exchange Server if the database is not restored or restored partially.

SUMMARY OF THE INVENTION

The present invention is related to an online (i.e., a runtime) backup and restoration of an MS Exchange Server, and more particularly, to performing a restoration based on a backed up data without restoring the data to the data storage device of a computer system that substantially obviates one or more of the problems and disadvantages of the related art.

In one aspect, there is provided a system, method and computer program product for writing MS Exchange Server data to the archive, which can be stored on a hard disk drive, a CD/DVD writeable/rewritable disk, on a flash drive, or on a network data storage device; to an incremental archive, or to any type of the writable data storage device.

The method for MS Exchange Server backup and restore comprises launching a system filter and applying logs; mounting a database from files located in a virtual folder; moving the file data from the archive into the real folder while the MS Exchange Server remains open and the database being restored is mounted.

The data is moved into the real folder from the archive by blocks. The database files of the MS Exchange Server are divided into data sets (i.e., blocks). For each block a special bit in its bitmap is marked to indicate, whether this block has been moved to the real folder or still remains in the archive (i.e., backup). The state of the blocks reflected in the bitmap determines whether the block in the real folder is updated (i.e., moved from the archive into the real folder, modified after application of the logs, modified during the operation of MS Exchange server, or the block is available in the archive)

When the blocks are moved, the updated blocks do not need to be transferred from the archive into the real folder. After the data blocks are moved into the real folder, the restored database is dismounted and the virtual folder is dismounted. The system filter is turned off and the database is mounted without employing the system filter.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

The present invention is related to an online (i.e., a runtime) backup and restoration of MS Exchange Server. According to an exemplary embodiment, backup and restoration of MS Exchange Server is performed based on a backed up data without restoring the data to the data storage device of a computer system.

In one aspect, there is provided a system, method and computer program product for writing MS Exchange Server data to the archive, which can be stored on a hard disk drive, a CD/DVD writeable/rewritable disk, on a flash drive, or on a network data storage device; to an incremental archive, or to any type of the writable data storage device.

Figure 2:
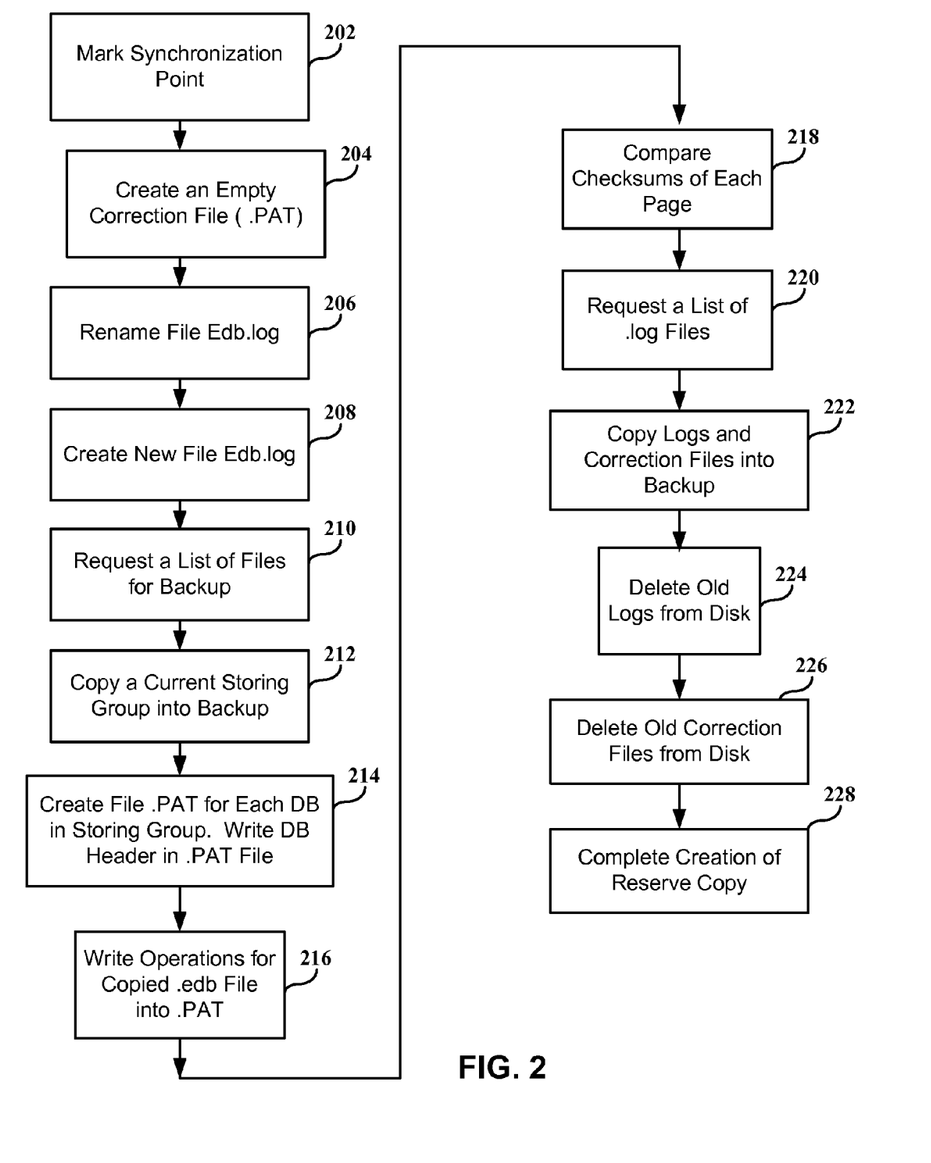
FIG. 2 illustrates a flowchart of MS Exchange Server backup in accordance with an exemplary embodiment.

The proposed system and method protects an MS Exchange Server from suspension (i.e., Server down time) in case of corruption or crash, and allows rapid recovery of the MS Exchange Server database. According to the exemplary embodiment, the database needs to be backed up in a very short time. FIG. 2 illustrates a flowchart of a method for MS Exchange Server rapid backup in accordance with the exemplary embodiment.

The process of reserve on-line copying (i.e., run-time backup) of the MS Exchange Server is started by launching a reserve copying application. This application calls a Web Storage System Service (WSS) service, indicating the desired type of reserve copying. Then, the backup process is started at step 202 by marking a synchronization point of the backup.

A this point the WSS informs an Exchange Server Engine (ESE) that it is in a reserve copying mode and an empty correction file (".PAT") is created at step 204 for each database being backed up. Note that in exemplary embodiment, during the process of an online backup the database is open for access and transactions can still be recorded in the database. If a transaction invokes an operation for an already copied database file (".edb") over the boarder of the reserve copying (i.e., a flag in ".edb" file indicating what is already copied and what is not yet copied), the page before the boarder is written into a correction file ".PAT".

A separate ".PAT" file for each backed up database is used. When the ESE is placed into a reserve copying mode, a new log file is open. For example, if a log file "edb.log" is currently open, it is closed and renamed at step 206 in order to correspond to a latest set of transactions. Then, a new file "edb.log" is created at step 208.

Then, at step 210, a list of files for backup is requested from MS Exchange Server. At step 212, the files from a list requested at step 210 (i.e., a current storing group) are copied into the backup archive. The database pages are ordered at step 214 by creating a correction file (".PAT") for each database and writing the database header into the correction file. The pages are grouped into fragments 64 KB each (i.e., 16 4-KB pages) and loaded into an operating memory. The operations corresponding to each copied database (".edb" file) are written into the correction file (i.e., ".PAT" file) at step 216. Then, the ESE checks a checksum for each page in order to confirm the integrity of data at step 218.

A checksum can be in a form of a hash string consisting of 4-byte segments. Such a hash string is generated and added to each page of the database for controlling the integrity of the page. The original checksum of the page is compared to a checksum of the page read into an EAM. Thus, it is verified that the data read out of the database and the data written into the database are identical.

MS Exchange database page has first 82 bytes allocated for page headers and flags indicating page type, as well as information about the data types contained in the page. When the page is loaded into memory, the checksum is calculated and a page number is verified. If the checksum does not coincide with the original checksum, this means that the page is corrupted. The ESE, in this case, will return an error, the database will be suspended and information about the corrupted page is recorded in the transaction log.

Note that the ESE does not cause page corruption, but only notifies about corrupted pages. The page corruption takes place at the point when data is written onto a disk. In most cases, corruption of database pages is caused by equipment or device driver failure. It is important to make sure that the drivers are updated and the latest versions are used. The Microsoft Product Support Services (PSS) can work with equipment manufacturers for solving all problems existing between their equipment and the Exchange Server database.

Comparing the checksums prevents storing corrupted data. Thus, a successfully created reserve copy of the MS Exchange Server database is definitely not corrupted, since each individual page is checked prior to copying it into a reserve database.

After verification of the checksums at step 218, a list of log files (".log") that are needed to be backed up is requested from MS Exchange Server at step 220. Then, at step 222, the logs and correction files are copied into the backup.

Then, the logs are truncated or deleted at step 224 when a new generation of files is created at the beginning of reserve copying. Also, the old correction files are erased from the disk at step 226. Then, the reserve files are closed, the ESE goes into a normal mode of operation and the reserve copying is completed at step 228.

Figure 3:
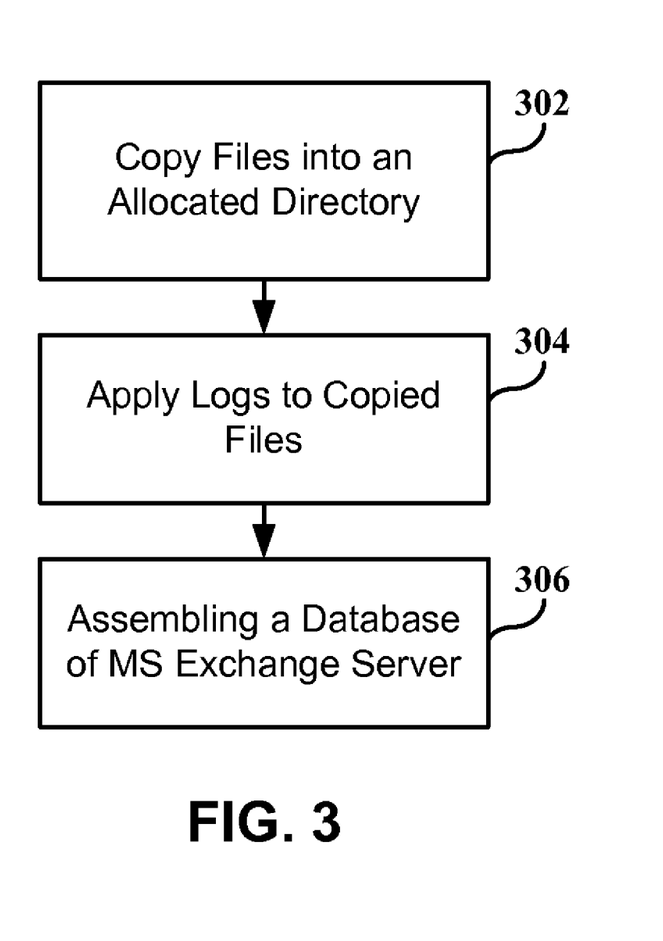
FIG. 3 illustrates a flowchart of recovery of MS Exchange database in accordance with the exemplary embodiment.

FIG. 3 illustrates a flowchart of recovery of MS Exchange database in accordance with the exemplary embodiment.

Before a database recovery process is started, the database needs to be disconnected and a storing group (i.e., files subject to backup) needs to be made inaccessible to users. According to the exemplary embodiment, it is done by an Exchange System Manager (ESM). The files are copied into an allocated directory at step 302.

Then, the database recovery process is started. The data storage device informs the ESE that recovery process is started and the ESE goes into a recovery mode. A reserve copying utility copies the database from reserve data storage directly into a final database destination. At step 304 the logs are applied to the copied files. The database is mounted, at step 306, from two files the ".EDB" file and the ".STM" file. The corresponding log files and correction files are copied into a temporary storage defined by a user, so they are not stored together with the files in an operational environment.

If the same path is specified for operational and for the temporary storage, the log files can be overwritten and the logical integrity of the operational database can be compromised. Therefore, the path to the temporary data storage has to be different from the path to the operational data storage.

After the log and correction files are restored into a temporary storage, the new recovery storing group for the database recovery is open. Then, the database is copied from the reserve storage into a temporary storage and into the recovery storing group. The data from the log files and from the corrections files located on the reserve storage is copied into the database by the database recovery utility.

Thus, each transaction in the log files is interpreted as follows. A time stamp of a transaction along with a page number referenced by the transaction is written into the database. Then, a time stamp of a corresponding page in the database is compared to the time stamp of the transaction in the log file. If the transaction in the log has a later time stamp, then the transaction is written into the database mounted at step 306. Otherwise, if the page in the database has a later time stamp than the time stamp of the transaction from the log, the ESE skips this transaction and move on to the next transaction, which is copied into the database.

Thus, the ESE processes the current logs and returns a user to a point when the database was corrupted. Note that this is possible only if all the logs of the latest successful full backup are available. Then, the ESE performs a cleanup by deleting the log files and the correction files from the temporary storage. The ESE also deletes an instance of reserve data storage. Then, the storing group is applied to a operational environment and the database is mounted at step 306.

Figure 4:
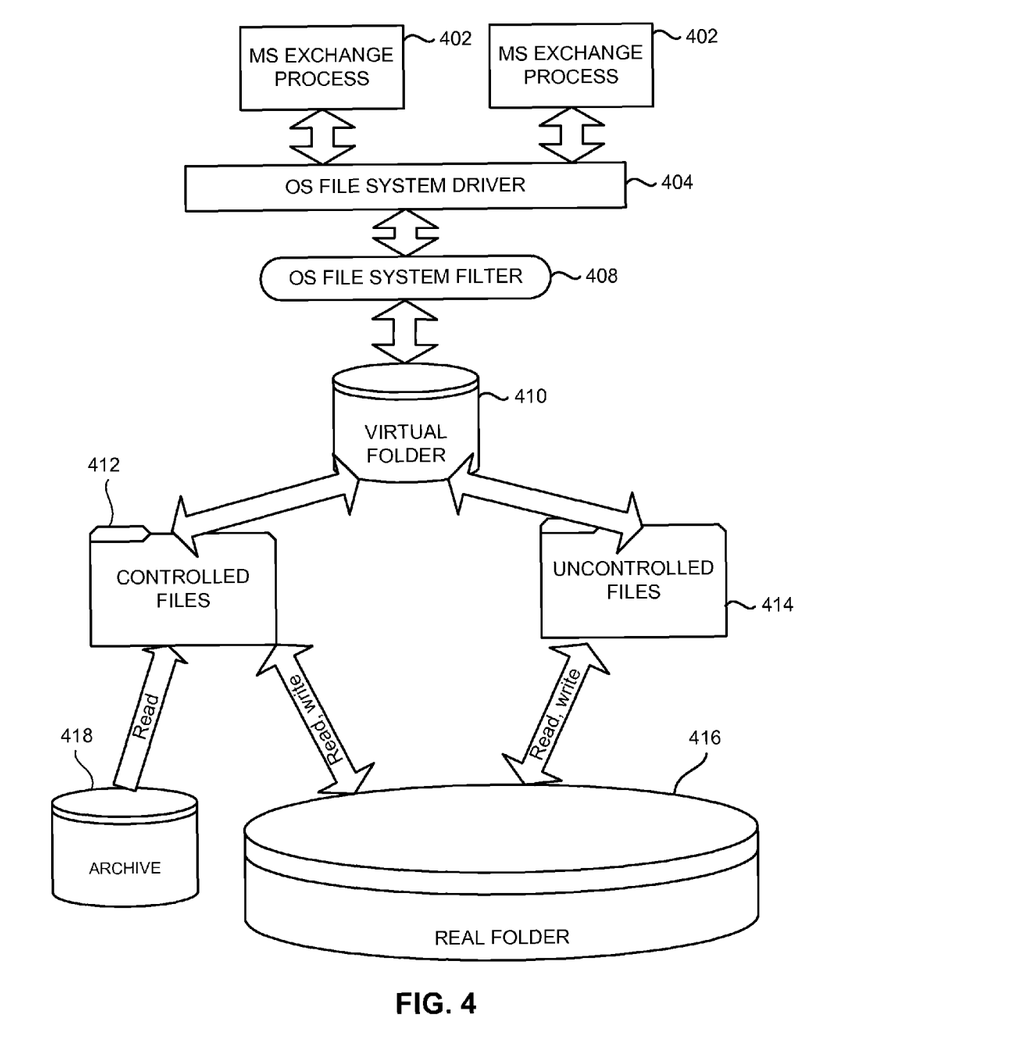
FIG. 4 illustrates a system in accordance with the exemplary embodiment.

FIG. 4 illustrates a system in accordance with the exemplary embodiment. The process of recovery of the files is started by a launch of an OS file system filter 408. MS Exchange processes 402 uses OS file system driver 404. Also, one or more OS thread processes may be executed in parallel with MS Exchange processes 402. An OS I/O subsystem is in communication with the file system driver 404.

The OS file system filter 408 uses data from a virtual folder 410 for mounting (i.e., recovering) a real folder 416. Controlled files 412 (i.e., restorable files of MS Exchange Server) and uncontrolled files 414 (i.e., non-restorable files that do not belong to MS Exchange Server) read from the real folder 416 into the virtual folder 410. The controlled files are also read from an archive (i.e., backup) 418. Then, the contents of the virtual folder are filtered by the OS file system filter 408 and is written back into the real folder 416. Thus, the real folder 416 contains all the files necessary for application of the logs and bringing the database to an updated state for further mounting. The controlled files can be of any kind, such as, for example, images, video files and documents.

Virtualization of the archived files of the archive 418 in the virtual folder 410 with the subsequent application of the backed up logs allows using the backed up database files using the file system filter 408 for redirection of read and write requests to and from the real folder 416 and the archive 418.

The data stored in the archive 418 cannot be modified. Therefore all write into the database requests are redirected to the files in the real folder. After all data of the archive 418 is moved into the real folder 416, the active database accessible through the virtualization means is stopped and the file system filter 408 is switched off. Then, the database is remounted and all read/write requests are directed only to the real folder.

The file system filter 408 decides where to direct the access (i.e., read or write) request, i.e., to the real folder 416 or to the archive (i.e., backup) 418. Thus, a read request is processed by the file system filter 408 and is redirected to the archive (i.e., backup) 418, if the requested data has not been moved into the real folder 416, or if the requested data has not been written into the real folder 416 by the server, or if the requested data has been modified by application of logs.

Otherwise the request is redirected to the real folder 416. Thus, if the data stored in the archive 418 has not been copied, modified by application of logs, or written into the real folder 416 since the beginning of the restoration process, then this data is read from the archive 418. The file system filter 408 processes and redirects all access requests to the real folder 416. Thus, all requests for modification or deletion of data in the files being restored are redirected to the real folder 416.

One way to implement the redirection filter is through the use of a bitmap that contains a set of translations, or links, to the locations of the relevant data. For example, the bitmap can have a bit or flag corresponding to each data block in the real folder, where, e.g., a "0" in the particular bit of the bitmap can represent the fact that the data in that set block of data has not been written to since the time t. A "1" therefore could represent the fact that the data of that set of data has been written to (or vice versa). In the event that it has been written to real folder, the database contains a link to the address at which the data can be found.

Figure 5:
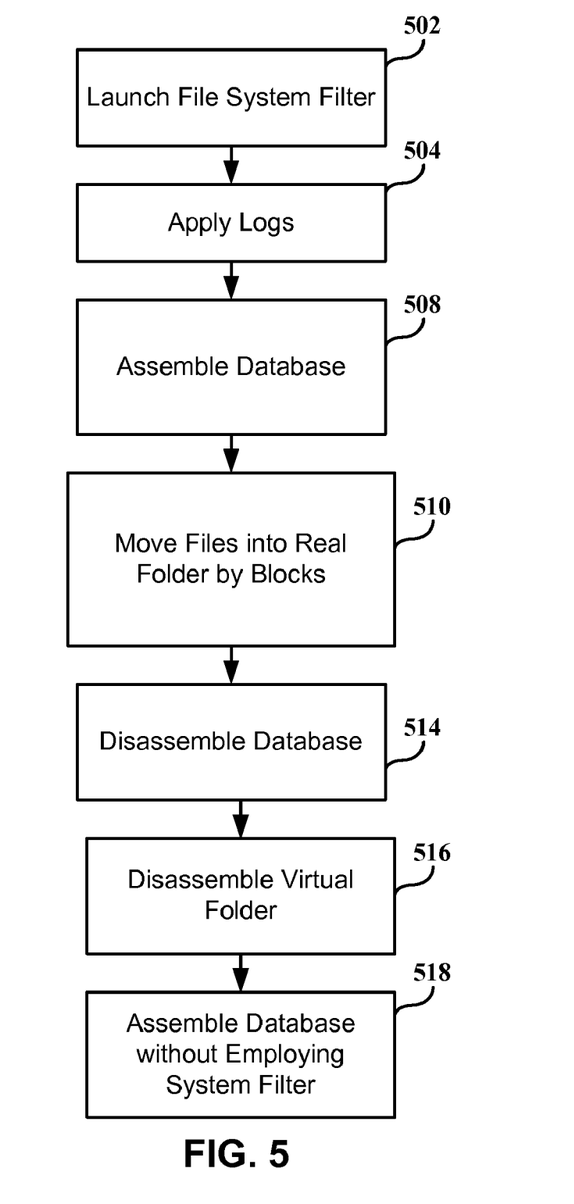
FIG. 5 illustrates a data-flow diagram employing a virtual folder in accordance with the exemplary embodiment.

Processes employed in application of the logs are illustrated in FIG. 5 depicting a data-flow diagram employing a virtual folder in accordance with the exemplary embodiment. A system filter is launched at step 502 and the logs are applied at step 504. Note that the logs can be applied before step 502. In other words, the backed up logs can be applied to the backed up database files.

This can be done using de-archiving of the database files or the logs can be applied to the already backed up database files by using special applications that allow working with the backed up files as if they were stored on a regular hard drive and not on reserve storage. In this case, data located in the archive does not need to be copied into the real folder because the data is made available by virtualization means.

After the logs are applied, at step 504, the database is mounted from files from the virtual folder at step 508. From this point on, the database of the MS Exchange Server can operate in a normal mode since data READ and WRITE requests are controlled by the OS file system filter (408 in FIG. 4). Then, at step 510, the file data from the archive is moved into the real folder, while the MS Exchange Server remains open, and the database being restored is mounted.

The data is moved into the real folder from the archive by blocks. The database files of the MS Exchange Server are divided into data sets (i.e., blocks). For each block, a special bit in its bitmap is marked to indicate whether this block has been moved to the real folder or still remains in the archive (i.e., backup). The state of the blocks reflected in the bitmap determines whether the block in the real folder is updated (i.e., moved from the archive into the real folder, modified after application of the logs, modified during the operation of MS Exchange server, or the block is available in the archive)

When the blocks are moved, the updated blocks do not need to be transferred from the archive into the real folder. After the data blocks are moved into the real folder, the restored database is dismounted (see step 514) and the virtual folder is dismounted at step 516. The system filter is turned off and the database is mounted without employing the system filter at step 518.

Figure 6:
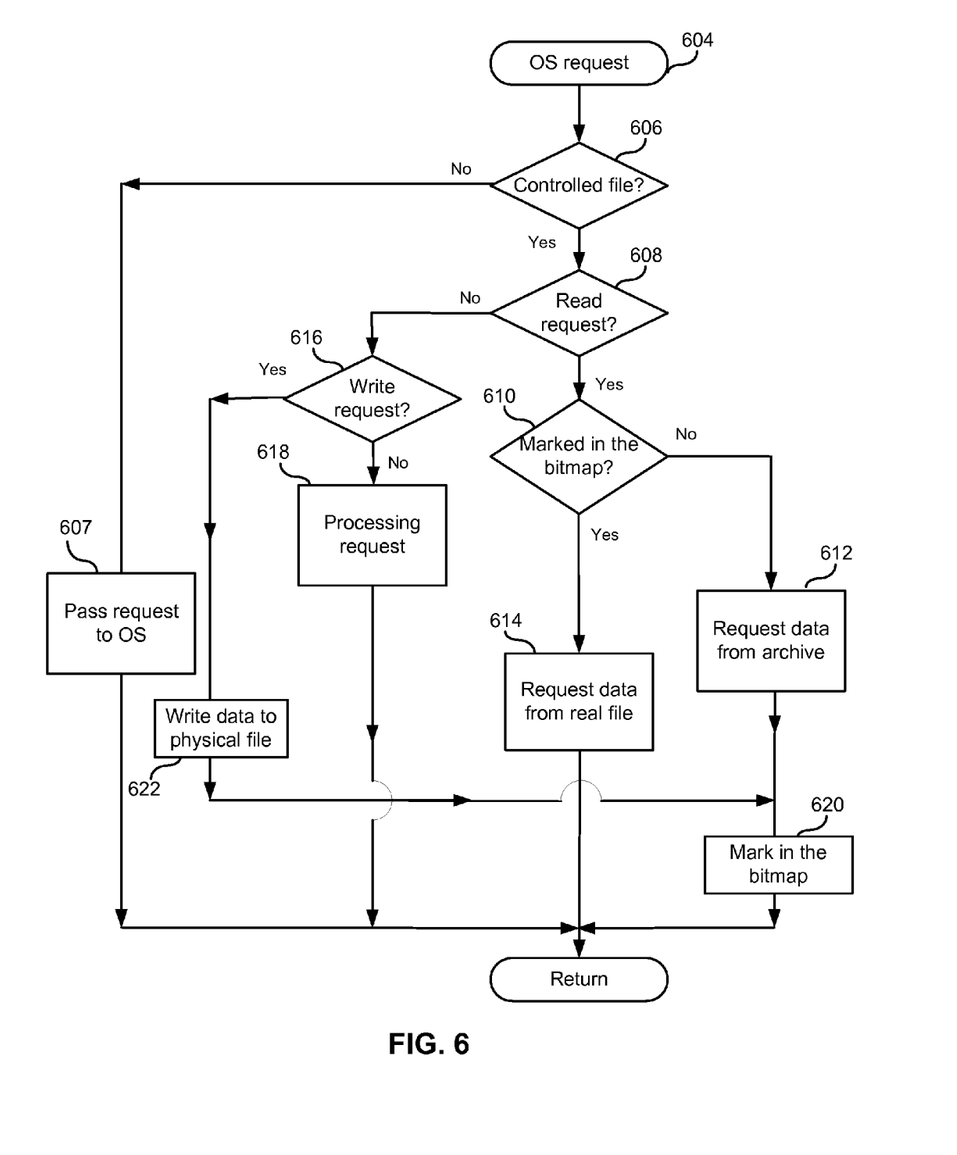
FIG. 6 illustrates handling READ and WRITE requests in accordance with the exemplary embodiment.

FIG. 6 illustrates a process of handling READ, WRITE requests, and other requests (for example a request for attributes file, such as file name, file size etc.). As shown in FIG. 6, after receiving an OS request (i.e., READ, WRITE requests directed to the virtual folder) in step 604, the process checks if the READ/WRITE or other requests that point to a controlled file in step 606. The controlled file in this case is the file, which was backed up into the archive and will be restored to the real folder 416, or is already being restored to the real folder 416.

If it is not a controlled file request (see step 606), the process redirects the access request to the OS in step 507. If, at step 606, it is determined that request is directed to the controlled file, the process, in step 608, checks if it is a READ request. If the access request is a READ request, then, in step 610, the process checks if the particular data block of the file is marked in the bitmap, thus indicating which data block from the archive was modified and that corresponding modified data is stored in the real folder.

If it is determined, in step 610, that the data block is marked in a bitmap, then the process goes to step 614, where the set of file data is requested from the real file be located on the real folder. If it is determined, in step 610, the data block is not marked in a bitmap, then the data is requested from the archive in step 612. Then the process moves onto step 620, where the block of file data is marked in the bitmap.

If, in step 608, it is determined that the request is not a READ request, then the process goes to step 616, where the process checks if it is a WRITE request. If it is a WRITE request, then, at step 622 the process writes the data into the real file located in the real folder. Then the process goes to step 620, where the bitmap is marked.

If in step 616 it is determined that a request is not a WRITE request, then the process goes to step 618, where all other requests are processed. For example, it can be a request for file name attribute. The file name is read either from memory or from the archive (i.e., backup) or from the real folder.

Those skilled in the art will appreciate that a proposed method and system provide for an effective backup and restore of MS Exchange Server without the server being suspended (i.e., having a down time). It also allows launching MS Exchange server if the database is not restored or only partially restored.

Figure 7:
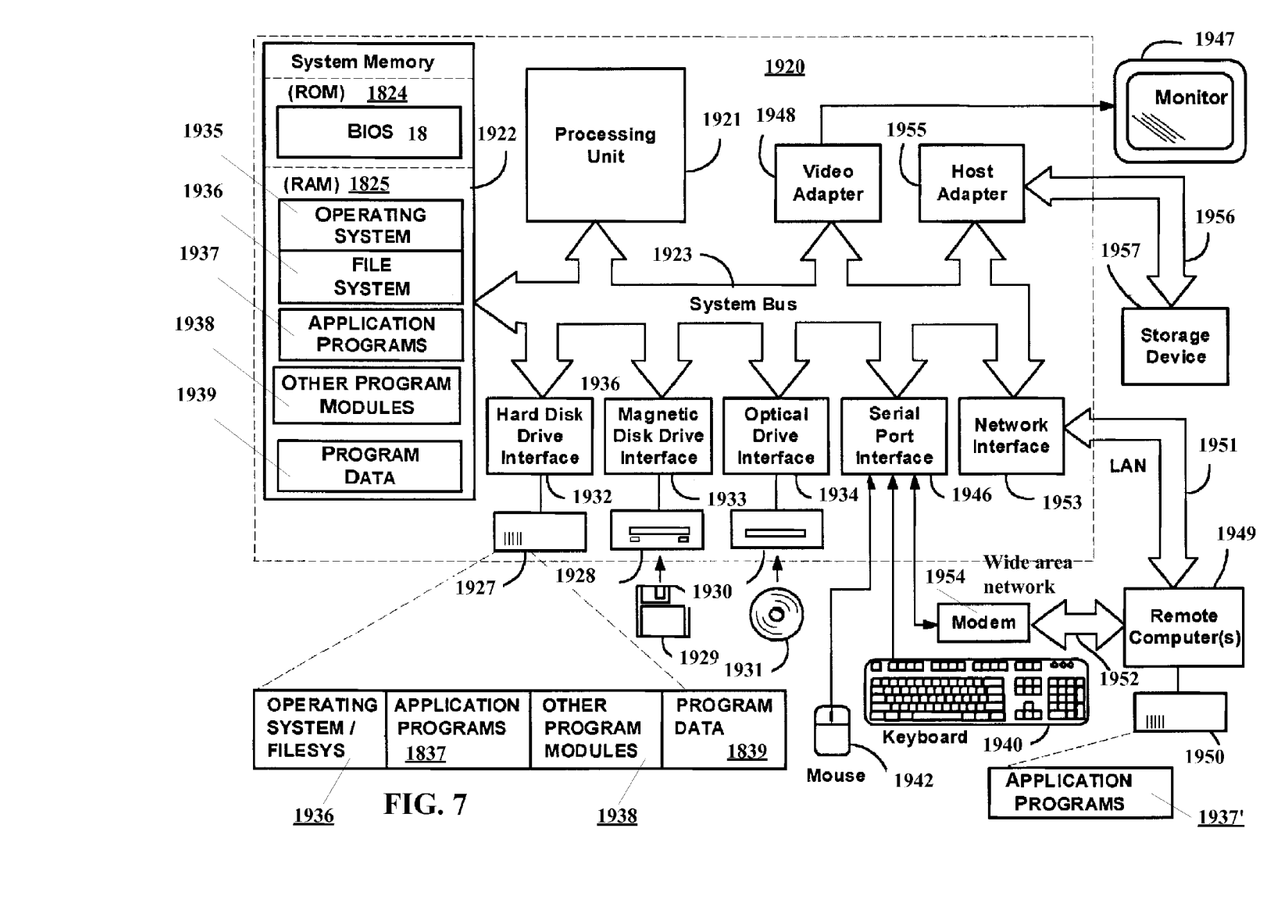
FIG. 7 illustrates an exemplary computer system that may be used for implementing the present invention.

With reference to FIG. 7, an exemplary system for implementing the invention includes a general purpose computing device in the form of a computer or server 1920 or the like, including a processing unit 1921, a system memory 1922, and a system bus 1923 that couples various system components including the system memory to the processing unit 1921. The system bus 1923 may be any of several types of bus structures including a memory bus or memory controller, a peripheral bus, and a local bus using any of a variety of bus architectures. The system memory includes read-only memory (ROM) 1924 and random access memory (RAM) 1925.

A basic input/output system 1926 (BIOS), containing the basic routines that help to transfer information between elements within the personal computer 1920, such as during start-up, is stored in ROM 1924. The personal computer 1920 may further include a hard disk drive 1927 for reading from and writing to a hard disk, not shown, a magnetic disk drive 1928 for reading from or writing to a removable magnetic disk 1929, and an optical disk drive 1930 for reading from or writing to a removable optical disk 1931 such as a CD-ROM, DVD-ROM or other optical media.

The hard disk drive 1927, magnetic disk drive 1928, and optical disk drive 1930 are connected to the system bus 1923 by a hard disk drive interface 1932, a magnetic disk drive interface 1933, and an optical drive interface 1934, respectively. The drives and their associated computer-readable media provide non-volatile storage of computer readable instructions, data structures, program modules and other data for the personal computer 1920.

Although the exemplary environment described herein employs a hard disk, a removable magnetic disk 1929 and a removable optical disk 1931, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 1929, optical disk 1931, ROM 1924 or RAM 1925, including an operating system 1935 (preferably Windows™ 2000). The computer 1920 includes a file system 1936 associated with or included within the operating system 1935, such as the Windows NT™ File System (NTFS), one or more application programs 1937, other program modules 1938 and program data 1939.

A user may enter commands and information into the personal computer 1920 through input devices such as a keyboard 1940 and pointing device 1942. Other input devices (not shown) may include a microphone, joystick, game pad, satellite dish, scanner or the like. These and other input devices are often connected to the processing unit 1921 through a serial port interface 1946 that is coupled to the system bus, but may be connected by other interfaces, such as a parallel port, game port or universal serial bus (USB). A monitor 1947 or other type of display device is also connected to the system bus 1923 via an interface, such as a video adapter 1948. In addition to the monitor 1947, personal computers typically include other peripheral output devices (not shown), such as speakers and printers.

A data storage device 1957, such as a hard disk drive, a magnetic tape, or other type of storage device is also connected to the system bus 1923 via an interface, such as a host adapter 1955 via a connection interface 1956, such as Integrated Drive Electronics (IDE), Advanced Technology Attachment (ATA), Ultra ATA, Small Computer System Interface (SCSI), SATA, Serial SCSI and the like.

The computer 1920 may operate in a networked environment using logical connections to one or more remote computers 1949. The remote computer (or computers) 1949 may be another personal computer, a server, a router, a network PC, a peer device or other common network node, and typically includes many or all of the elements described above relative to the personal computer 1920. It may further include a memory storage device 1950. The logical connections include a local area network (LAN) 1951 and a wide area network (WAN) 1952. Such networking environments are commonplace in offices, enterprise-wide computer networks, Intranets and the Internet.

When used in a LAN networking environment, the personal computer 1920 is connected to the local area network 1951 through a network interface or adapter 1953. When used in a WAN networking environment, the personal computer 1920 typically includes a modem 1954 or other means for establishing communications over the wide area network 1952, such as the Internet.

The modem 1954, which may be internal or external, is connected to the system bus 1923 via the serial port interface 1946. In a networked environment, program modules depicted relative to the personal computer 1920, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A system for backup and restore of an MS Exchange server, the system comprising:
    a non-transitory storage medium storing a file system and a file system driver for providing data exchange between the file system and server processes;
    a file system filter coupled to the file system driver;
    a data archive containing a backup of controlled and uncontrolled files and accessible by the file system filter, wherein the uncontrolled files are not subject to restoration when the MS Exchange server is restored;
    a virtual folder that, to the file system, appears to contain controlled files and accessible by the file system filter, wherein the virtual folder contains only redirect links but no actual file data and interfaces to the file system through the file system filter and then through the file system driver; and
    a real folder containing controlled files and accessible by the file system filter, wherein the controlled files are subject to restoration from the virtual folder on a block by block basis: the redirect links pointing to file data in the archive and to the real folder,
    wherein the system filter redirects access requests to and from the virtual folder for creating the archive and recovering the real folder, such that the controlled files in the archive are accessible by the file system through the file system filter during the process of restoration and before all the controlled files are fully restored,
    wherein, during the restoration process, log files of the MS Exchange server are first copied to a temporary storage having a different path than the non-transitory storage medium,
    wherein contents of the virtual folder is used to mount the real folder during the process of restoration, and
    wherein a database of the MS Exchange server is mounted in the virtual folder, and the database is brought to a consistent state by applying the log files to the database of the MS Exchange.

2. The method of claim 1, wherein the controlled files include an MS Exchange Server database.

3. The system of claim 1, wherein the controlled files are restorable server files.

4. The system of claim 1, wherein the uncontrolled files are not restorable files that do not belong to the server.

5. The system of claim 1, wherein the access requests are read and write requests.

6. A method for backup and restore of an MS Exchange Server, the method comprising:
- launching a file system filter;
- creating a virtual folder, wherein the virtual folder contains only redirect links but no actual file data and interfaces to the file system through the file system filter and then through a file system driver;
- applying transaction logs to database files located in the virtual folder;
- mounting the virtual folder with a database that appears to the MS Exchange Server as having the MS Exchange server files in a real folder, the redirect links pointing to file data in the archive and to the real folder;
- moving the database files that are being restored from an archive on a block by block basis into the real folder, the real folder containing MS Exchange files that are restorable;
- dismounting the database in the virtual folder;
- dismounting the virtual folder; and
- remounting the database in the real folder from the virtual folder,
- wherein the file system filter redirects access requests to and from the virtual folder such that the controlled files in the archive are accessible by the file system through the file system filter during the process of mounting and restoration and before the MS Exchange Server files are fully restored, and
- wherein, during the restoration process, the transaction logs are first copied to a temporary storage having a different path than the non-transitory storage medium, and the database is brought to a consistent state by applying the log files to the database of the MS Exchange.

7. A system comprising:
- a processor;
- a memory coupled to the processor; and
- a computer code logic stored in the memory and executed on the processor for implementing the method of claim 6.

8. The method of claim 6, further comprising marking, in a bitmap, the blocks moved into the real folder, as part of the restoration process.

9. The method of claim 8, wherein the marking comprises marking a special bit on the bitmap of the block to indicate that the block is moved to the real folder.

* * * * *